US010135379B2

(12) United States Patent
Iwahashi et al.

(10) Patent No.: US 10,135,379 B2
(45) Date of Patent: Nov. 20, 2018

(54) STATE DISPLAY DEVICE OF INDUSTRIAL MACHINERY AND POWER CONVERSION DEVICE

(71) Applicant: KABUSHIKI KAISHA YASKAWA DENKI, Kitakyushu-shi (JP)

(72) Inventors: Koji Iwahashi, Kitakyushu (JP); Satoshi Sueshima, Kitakyushu (JP); Tetsuo Yanagimoto, Kitakyushu (JP); Yuto Kubo, Kitakyushu (JP); Yuki Kawafuchi, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 0 days.

(21) Appl. No.: 15/634,173

(22) Filed: Jun. 27, 2017

(65) Prior Publication Data
US 2017/0294861 A1 Oct. 12, 2017

Related U.S. Application Data

(63) Continuation of application No. PCT/JP2015/076813, filed on Sep. 18, 2015.

(51) Int. Cl.
*G06F 3/0362* (2013.01)
*H02P 27/06* (2006.01)
(Continued)

(52) U.S. Cl.
CPC ............ *H02P 27/06* (2013.01); *G02B 6/0045* (2013.01); *G02B 6/0068* (2013.01);
(Continued)

(58) Field of Classification Search
CPC .... G06F 3/0362; G06F 3/044; G06F 3/04845; G06F 3/0488; B60K 2350/1064;
(Continued)

(56) References Cited

U.S. PATENT DOCUMENTS 4,095,405 A * 6/1978 Tanaka ................... G04C 3/007
368/28
4,188,654 A * 2/1980 Reich ................... G01R 13/405
362/212
(Continued)

FOREIGN PATENT DOCUMENTS

JP S50-103993 A 8/1975
JP S55-162064 A 12/1980
(Continued)

OTHER PUBLICATIONS

Office Action dated Jul. 27, 2016 in Japanese Application No. 2016-532159, filed Sep. 18, 2015 with English Translation.
(Continued)

*Primary Examiner* — Bickey Dhakal
(74) *Attorney, Agent, or Firm* — Oblon, McClelland, Maier & Neustadt, L.L.P.

(57) ABSTRACT

An LED indicator 4 connected to industrial machinery including an inverter 1, includes: an LED substrate 8 into which a display control signal according to a state relating to the industrial machinery is input; and a plurality of displays 31, 32, and 33 configured to display in a lighting state corresponding to a state of the industrial machinery, on the basis of the display control signal input by the LED substrate 8. The plurality of displays 31, 32, and 33 each include a partially circular-arc shape, and are generally arranged in an approximately annular shape. The plurality of displays 31, 32, and 33 include the two displays 31, 32 that generally configure a half ring at one side of the approximately annular shape, and the one display 33 that generally configures a half ring at the other side of the approximately annular shape.

19 Claims, 8 Drawing Sheets

(51) Int. Cl.
*G08B 5/36* (2006.01)
*F21V 8/00* (2006.01)
*G05B 19/418* (2006.01)

(52) U.S. Cl.
CPC ......... *G02B 6/0075* (2013.01); *G05B 19/418* (2013.01); *G08B 5/36* (2013.01); *G05B 2219/32128* (2013.01)

(58) Field of Classification Search
CPC ............ B60K 35/00; B60K 2350/1092; B60K 6/445; B60K 2350/2008; B60K 37/02; B60K 2350/408; B60K 2350/965; B60K 37/06; G05D 23/19
See application file for complete search history.

(56) References Cited

U.S. PATENT DOCUMENTS

| | | | | |
|---|---|---|---|---|
| 5,166,610 A * | 11/1992 | Bezos | G01P 1/08 | 246/191 |
| 5,216,641 A * | 6/1993 | Hoel | A63B 71/0686 | 368/10 |
| 5,427,011 A * | 6/1995 | Steinberger | G10G 7/02 | 362/23.18 |
| 5,548,300 A * | 8/1996 | Tokimoto | G09F 9/33 | 340/815.45 |
| 5,549,028 A * | 8/1996 | Steinberger | G10G 7/02 | 84/454 |
| 5,694,376 A * | 12/1997 | Sullivan | G04G 9/02 | 368/240 |
| 6,337,469 B1 * | 1/2002 | Chung | H05B 6/6435 | 219/506 |
| 6,348,772 B1 * | 2/2002 | May | B60K 37/06 | 200/314 |
| 7,042,814 B2 * | 5/2006 | Yamada | G10H 1/0091 | 369/30.26 |
| 7,394,731 B2 * | 7/2008 | Yamada | G10H 1/0091 | 369/30.26 |
| 7,400,110 B2 * | 7/2008 | Potter | H02J 3/01 | 318/801 |
| 7,579,959 B2 * | 8/2009 | Choo | G11B 33/10 | 340/815.45 |
| 7,724,212 B2 * | 5/2010 | Repetto | G01C 21/36 | 345/30 |
| 7,966,123 B2 * | 6/2011 | Watanabe | B60K 37/02 | 340/439 |
| 8,154,037 B2 * | 4/2012 | Kadotani | F21V 29/74 | 257/712 |
| 8,195,313 B1 * | 6/2012 | Fadell | F24F 11/0009 | 236/1 C |
| 8,280,536 B1 * | 10/2012 | Fadell | F24F 11/0009 | 700/83 |
| 8,327,671 B2 * | 12/2012 | Kim | D06F 39/005 | 68/12.27 |
| 8,359,152 B2 * | 1/2013 | Jinno | B60K 6/445 | 701/123 |
| 8,359,153 B2 * | 1/2013 | Jinno | B60K 6/445 | 701/123 |
| 8,489,243 B2 * | 7/2013 | Fadell | F24F 11/0009 | 236/1 C |
| 8,588,032 B2 * | 11/2013 | Geyer | G04G 9/0017 | 368/11 |
| 8,593,427 B1 * | 11/2013 | Yang | G06F 1/3259 | 178/18.01 |
| 8,717,328 B1 * | 5/2014 | Yang | G06F 1/3259 | 178/18.01 |
| 2002/0172107 A1 * | 11/2002 | Yamada | G11B 19/04 | 369/30.24 |
| 2005/0207157 A1 * | 9/2005 | Tani | G03B 21/14 | 362/244 |
| 2006/0181968 A1 * | 8/2006 | Yamada | G10H 1/0091 | 369/30.26 |
| 2006/0185499 A1 * | 8/2006 | D'Addario | G10G 7/02 | 84/454 |
| 2006/0193147 A1 * | 8/2006 | Inoue | G02B 6/0018 | 362/602 |
| 2007/0009226 A1 * | 1/2007 | Choo | G11B 33/10 | 386/231 |
| 2007/0078598 A1 * | 4/2007 | Watanabe | B60K 37/02 | 701/429 |
| 2007/0176576 A1 * | 8/2007 | Potter | H02J 3/01 | 318/801 |
| 2007/0188409 A1 * | 8/2007 | Repetto | G01C 21/36 | 345/30 |
| 2008/0018488 A1 * | 1/2008 | Struck | B60K 35/00 | 340/815.86 |
| 2008/0105191 A1 * | 5/2008 | Kato | G01D 11/28 | 116/288 |
| 2009/0225539 A1 * | 9/2009 | Baldwin | G01N 21/47 | 362/227 |
| 2010/0030413 A1 * | 2/2010 | Jinno | B60K 6/445 | 701/22 |
| 2010/0195027 A1 * | 8/2010 | Yoshida | G02F 1/133707 | 349/106 |
| 2010/0265172 A1 * | 10/2010 | Sadahiro | G06F 3/0338 | 345/157 |
| 2011/0019420 A1 * | 1/2011 | Kadotani | F21V 29/74 | 362/249.03 |
| 2011/0068686 A1 | 3/2011 | Osawa | | |
| 2011/0182151 A1 * | 7/2011 | Geyer | G04G 9/0017 | 368/11 |
| 2011/0222244 A1 | 9/2011 | Takashiro et al. | | |
| 2012/0049779 A1 | 3/2012 | Kawajiri et al. | | |
| 2012/0136531 A1 * | 5/2012 | Jinno | B60K 6/445 | 701/34.2 |
| 2012/0203379 A1 * | 8/2012 | Sloo | F24F 11/0086 | 700/276 |
| 2012/0224364 A1 * | 9/2012 | Mizuta | F21S 8/04 | 362/231 |
| 2012/0239207 A1 * | 9/2012 | Fadell | F24F 11/0009 | 700/276 |
| 2013/0046397 A1 * | 2/2013 | Fadell | F24F 11/0009 | 700/83 |
| 2013/0141957 A1 | 6/2013 | Tanaka | | |
| 2013/0329415 A1 * | 12/2013 | Lin | F21V 14/00 | 362/227 |
| 2013/0345883 A1 * | 12/2013 | Sloo | F24F 11/0086 | 700/276 |
| 2014/0182509 A1 * | 7/2014 | Hackenberg | B60K 35/00 | 116/28 R |
| 2014/0333602 A1 * | 11/2014 | Yang | G06F 1/3262 | 345/212 |
| 2014/0365019 A1 * | 12/2014 | Gourlay | F24F 11/0086 | 700/278 |
| 2016/0260418 A1 * | 9/2016 | Zhang | G06F 3/0488 | |
| 2016/0358526 A1 * | 12/2016 | Wang | G09G 3/3208 | |
| 2017/0150654 A1 * | 5/2017 | Kubo | H02M 7/003 | |
| 2017/0321366 A1 * | 11/2017 | Oh | D06F 39/005 | |

FOREIGN PATENT DOCUMENTS

| | | |
|---|---|---|
| JP | S58-070096 U | 5/1983 |
| JP | H03-100889 U | 10/1991 |
| JP | H08-126387 A | 5/1996 |
| JP | H09-114413 A | 5/1997 |
| JP | 2005-143163 A | 6/2005 |
| JP | 2011-192809 A | 9/2011 |
| WO | WO 2009/151026 A1 | 12/2009 |
| WO | WO 2010/131361 A1 | 11/2010 |
| WO | WO 2012/020473 A1 | 2/2012 |
| WO | WO 2014176223 A1 | 10/2014 |

OTHER PUBLICATIONS

International Search Report dated Dec. 15, 2015 in PCT/JP2015/076813, filed Sep. 18, 2015.
International Preliminary Report on Patentability and Written Opinion dated Mar. 29, 2018 in PCT/JP2015/076813, 11 pages.

(56) References Cited

OTHER PUBLICATIONS

Office Action dated Jul. 2, 2018, in Chinese Patent Application 201530064925.5 (with English-language translation) (11 pgs.).

* cited by examiner

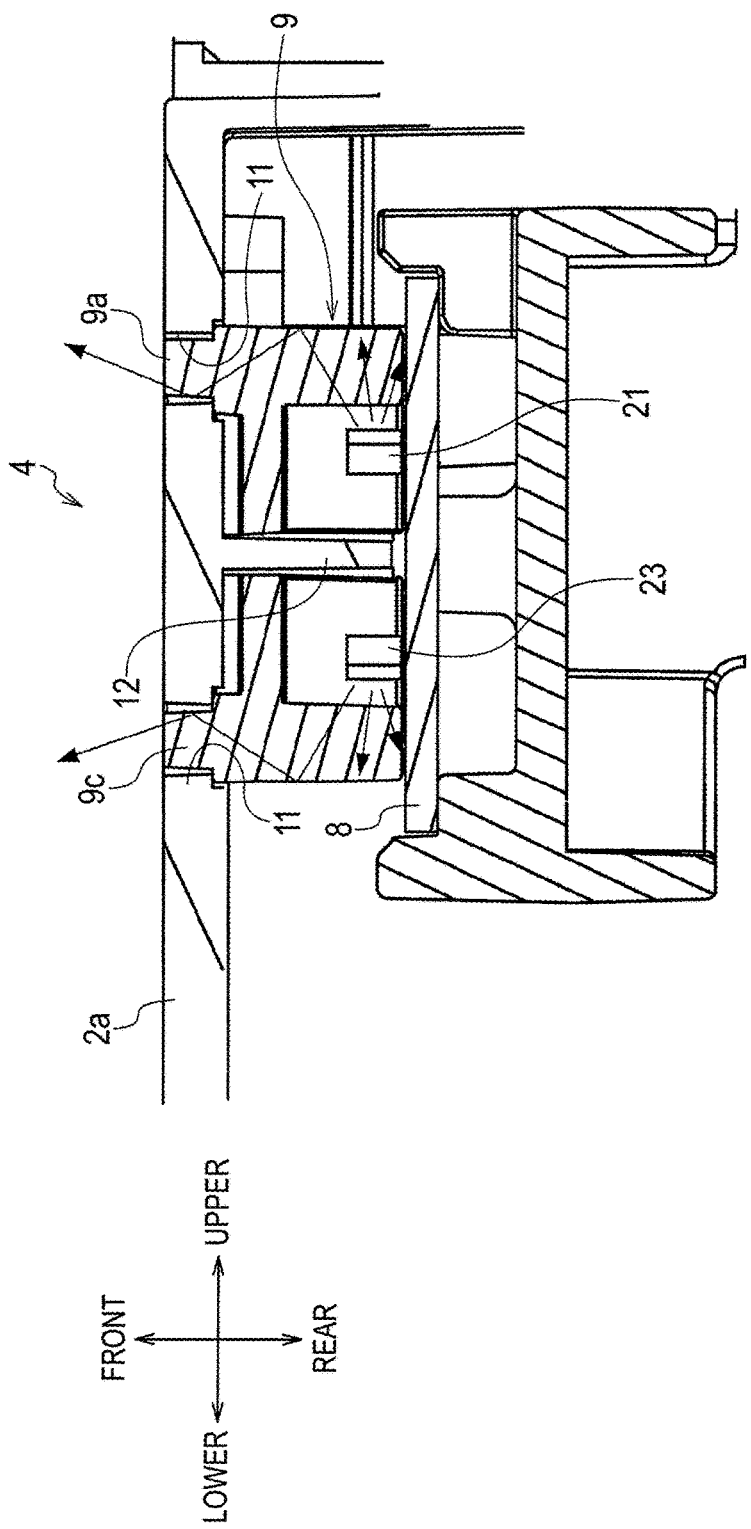

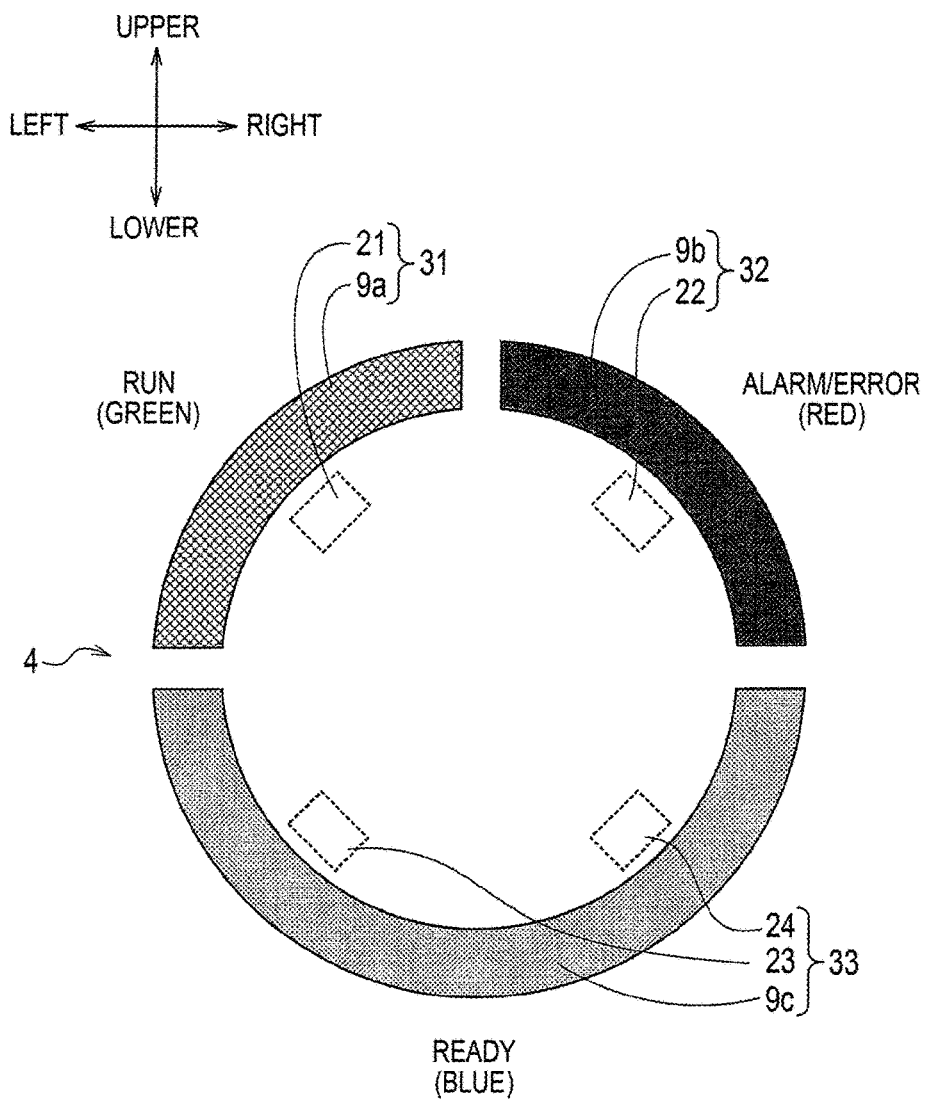

FIG. 5

| DISPLAYING PORTION | CONTINUOUS LIGHTING STATE | LOW-SPEED FLICKERING STATE | HIGH-SPEED FLICKERING STATE | LIGHTS-OUT STATE |
|---|---|---|---|---|
| RUN (GREEN) | - DURING NORMAL DRIVE | - DURING DECELERATION STOP STATE<br>- SPEED COMMAND DURING DRIVE COMMAND INPUT = DURING 0 INPUT | - DURING SUDDEN STOP DECELERATION<br>- DURING INTERLOCK OPERATION STOP | - DURING DRIVE STOP |
| ALARM/ERROR (RED) | - DURING DETECTION OF ALARM OR ERROR | - DURING ALARM STATE GENERATION<br>- DURING OPE DETECTION<br>- FAILURE DURING AUTOMATIC TUNING OR DURING ERROR GENERATION STATE | - DURING STO FUNCTION ERROR/ALARM GENERATION | - DURING NORMAL STATE (NON-FAILURE, NON-ALARM STATE) |
| READY (BLUE) | (EQUIVALENT TO MFMO PREPARATION STATE)<br>- DURING DRIVE PREPARATION<br>- DURING NON-FAILURE STATE<br>- DURING STO RELEASE | - DURING STO OPERATION DURING NON-FAILURE STATE | — | - DURING PROGRAMMING MODE OR FAILURE OR INTERNAL ERROR STATE |

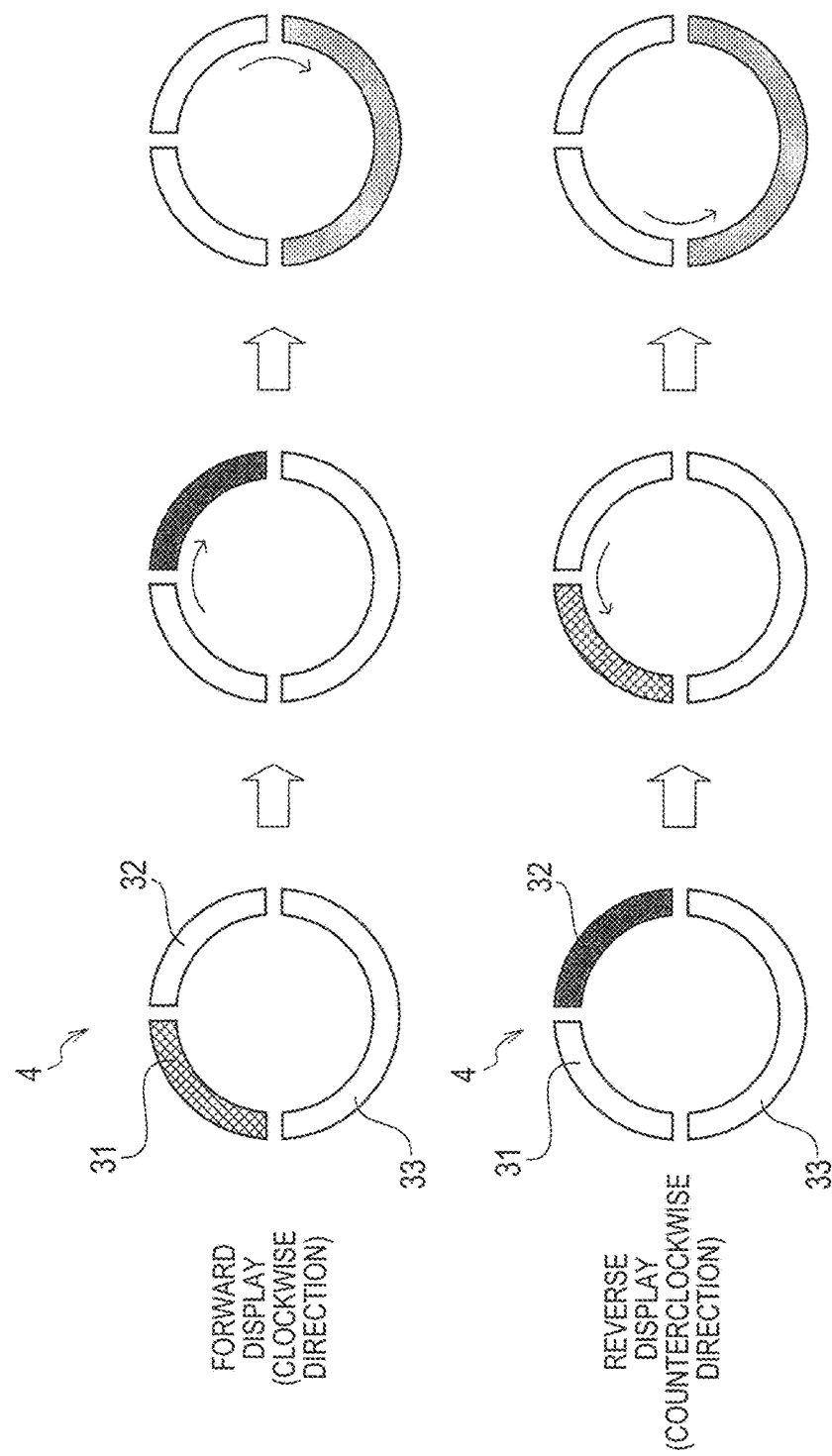

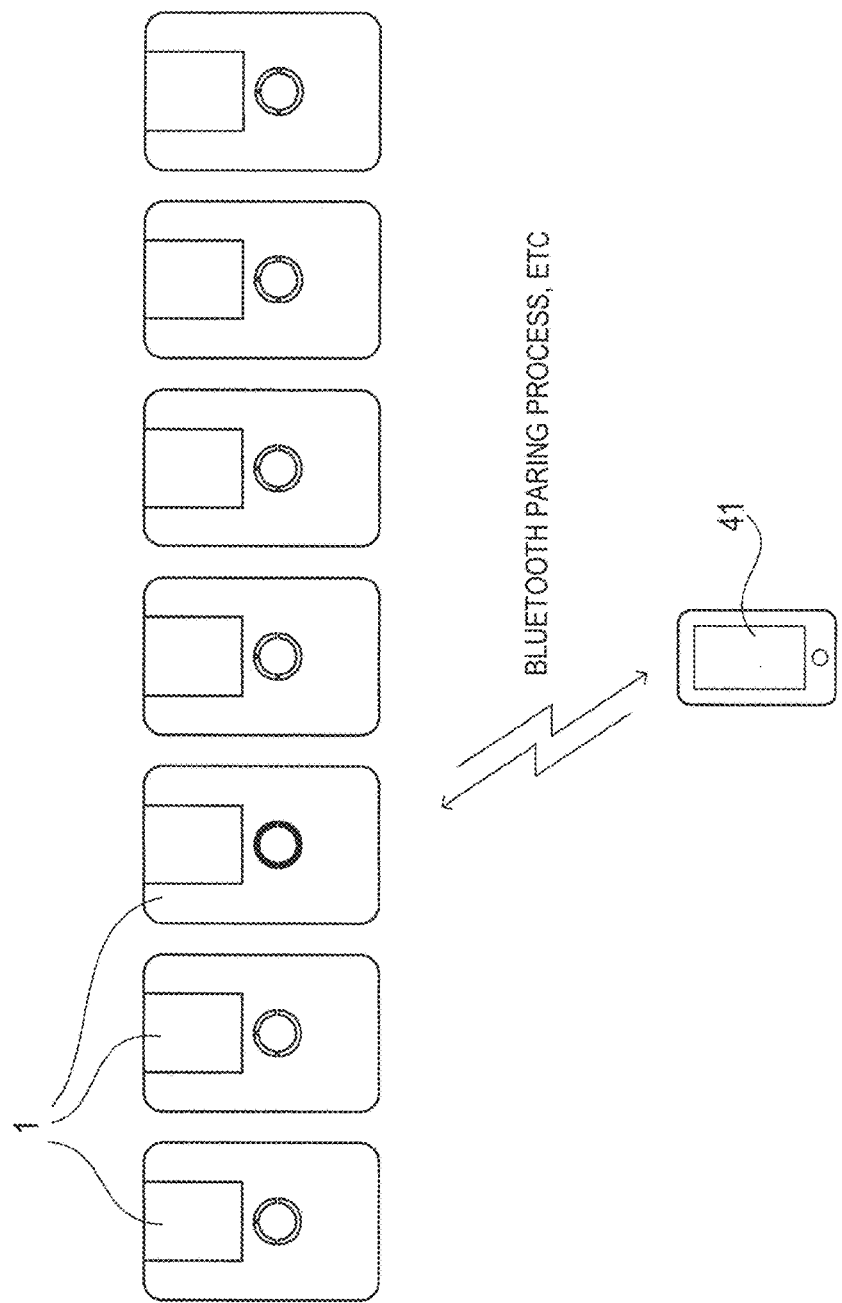

STATE DISPLAY DEVICE OF INDUSTRIAL MACHINERY AND POWER CONVERSION DEVICE

CROSS-REFERENCE TO RELATED APPLICATIONS

The present application is a continuation of International Application No. PCT/JP2015/076813, filed Sep. 18, 2015, the entire contents of which are incorporated herein by reference.

TECHNICAL FIELD

The disclosed embodiment relates to a state display device of industrial machinery and a power conversion device.

BACKGROUND ART

Patent Literature 1 discloses an inverter or a DC/DC converter that converts power fed from outside into a predetermined form of power, and a power conversion device provided with a CPU that controls these components.

CITATION LIST

[Patent Literature]
  [PTL 1] Japanese Patent Application No. 2011-192809

SUMMARY OF INVENTION

Technical Problem

A power conversion device as described above is also used for a drive control of a motor that functions as an actuator in industrial machinery such as a factory automation. There is a demand that an internal control state of such a power conversion device is desirably checked easily through a visual inspection at a site of work; however, the power conversion device is often installed at a location apart from a user pathway and in a dark room inside a switchboard or the like, and thus, conventionally, there is no means of easily checking the control state in such a case.

The present invention has been achieved in view of such a problem, and an object thereof is to provide a state display device of industrial machinery with which it is possible to easily check a control state of the industrial machinery and a power conversion device.

Solution to Problem

To resolve the above problem, according to one aspect of the present invention, a state display device of industrial machinery is applied which includes: an inputter configured to input a display control signal according to a state relating to the industrial machinery; and a plurality of displays configured display in a lighting state corresponding to a state of the industrial machinery, on the basis of the display control signal input by the inputter, wherein the plurality of displays are generally arranged in an approximately annular shape; the plurality of displays include: two displays that generally configures a half ring at one side of the approximately annular shape; and one display that generally configures a half ring at the other side of the approximately annular shape.

Further, according to another aspect of the present invention, a power conversion device is applied which includes: a power converter configured convert an external supply power into a drive control power to an electric motor; a display controller configured to output a display control signal according to a state relating to the power converter; and a display configured display in a lighting state corresponding to a state of the power converter, on the basis of the display control signal, wherein the plurality of displays are generally arranged in an approximately annular shape; the plurality of displays include: two displays that generally configures a half ring at one side of the approximately annular shape; and one display that generally configures a half ring at the other side of the approximately annular shape.

Further, according to another aspect of the present invention, a state display device of industrial machinery is applied which comprises: means of inputting a display control signal according to a state relating to the industrial machinery; and means of displaying a state of the industrial machinery in a light-emission state based on the input display control signal.

Advantageous Effects of Invention

According to the present invention, it is possible to easily check a control state of industrial machinery.

BRIEF DESCRIPTION OF DRAWINGS

FIG. 3 is a cross-sectional view around the LED indicator as viewed along an arrow III to III in FIG. 2.

FIG. 4 is a front enlarged view obtained when the LED indicator is viewed from the front side in a direction shown by an arrow A in FIG. 1.

FIG. 5 is a table representing an example of a corresponding relationship between a lighting state of each displaying portion in the LED indicator and an internal control state of an inverter FIG. 6 is a diagram describing a display mode of a rotation display of the LED indicator.

FIG. 7 is a diagram representing an example in which a communication state of an information exchange via radio communication with a mobile terminal in a large number of inverters is displayed by the LED indicator.

DESCRIPTION OF EMBODIMENTS

With reference to the drawings, an embodiment will be described, below. It is noted that in the description that follows, when "front", "rear", "left", "right", "upper", and "lower" are mentioned for an inverter, these correspond to arrow directions, respectively, appropriately indicated in the individual drawings such as FIG. 1. Definitions of these directions in the present embodiment are based on the orientations in the respective directions in a standard installation state of the inverter. However, the orientations in the respective directions may be appropriately changed depending upon a posture in which the inverter is mounted.

Figure 1:
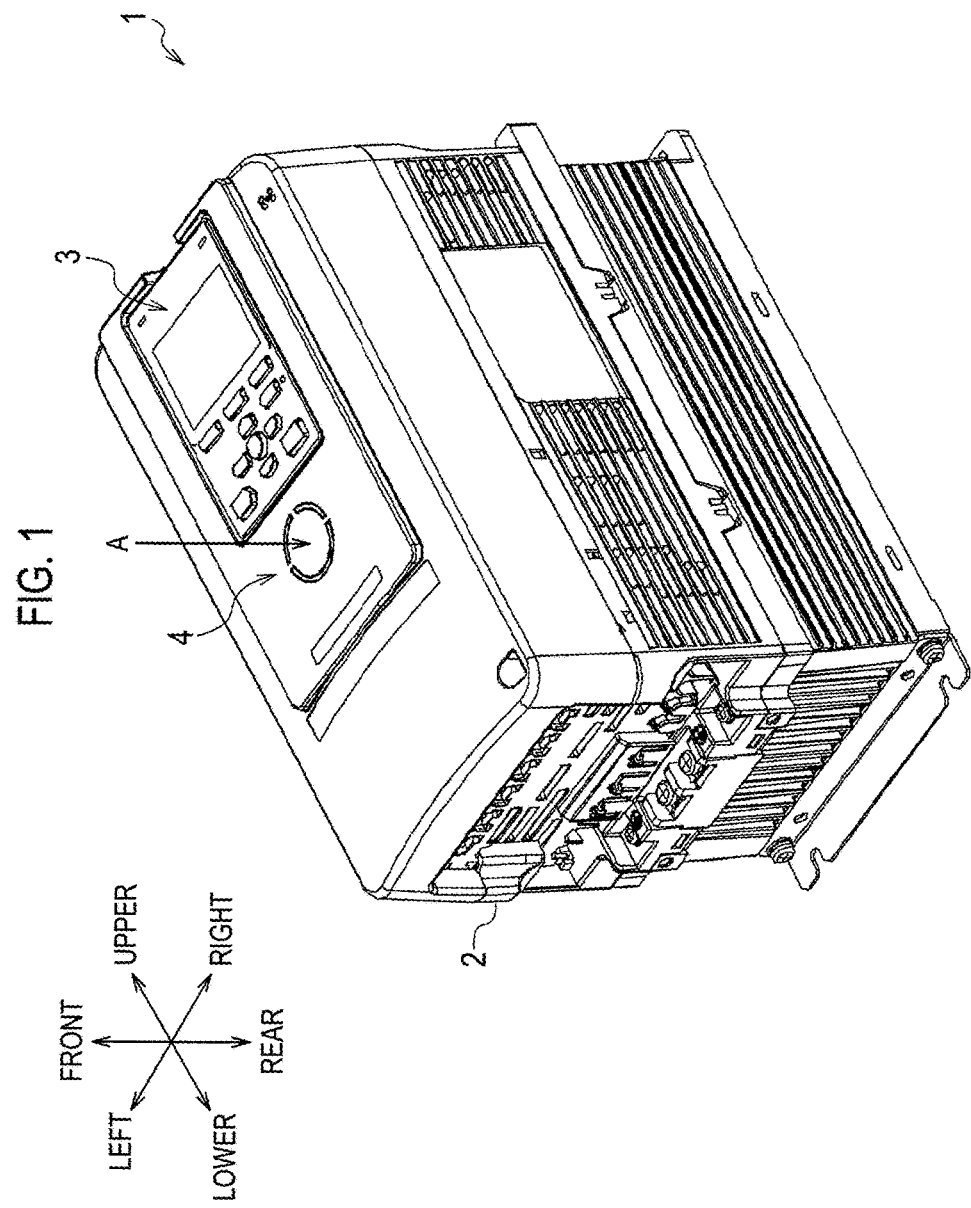
FIG. 1 is an external perspective view in a completed state of an inverter provided with an LED indicator according to an embodiment.

FIG. 1 obliquely represents an entire exterior view of an inverter in a completed state according to the present embodiment. In FIG. 1, an inverter 1 is a power conversion device that converts three-phase AC power supplied from outside into drive control power to be input to an electric motor (not shown in particular) such as a motor, and has a housing 2 that is an enclosure generally formed in an approximately rectangular parallelepiped shape. The housing 2 has, at its front face, an operator 3 that operates the inverter 1 and displays information; and an LED indicator 4 that simply displays an internal control state of the inverter 1.

Figure 2:
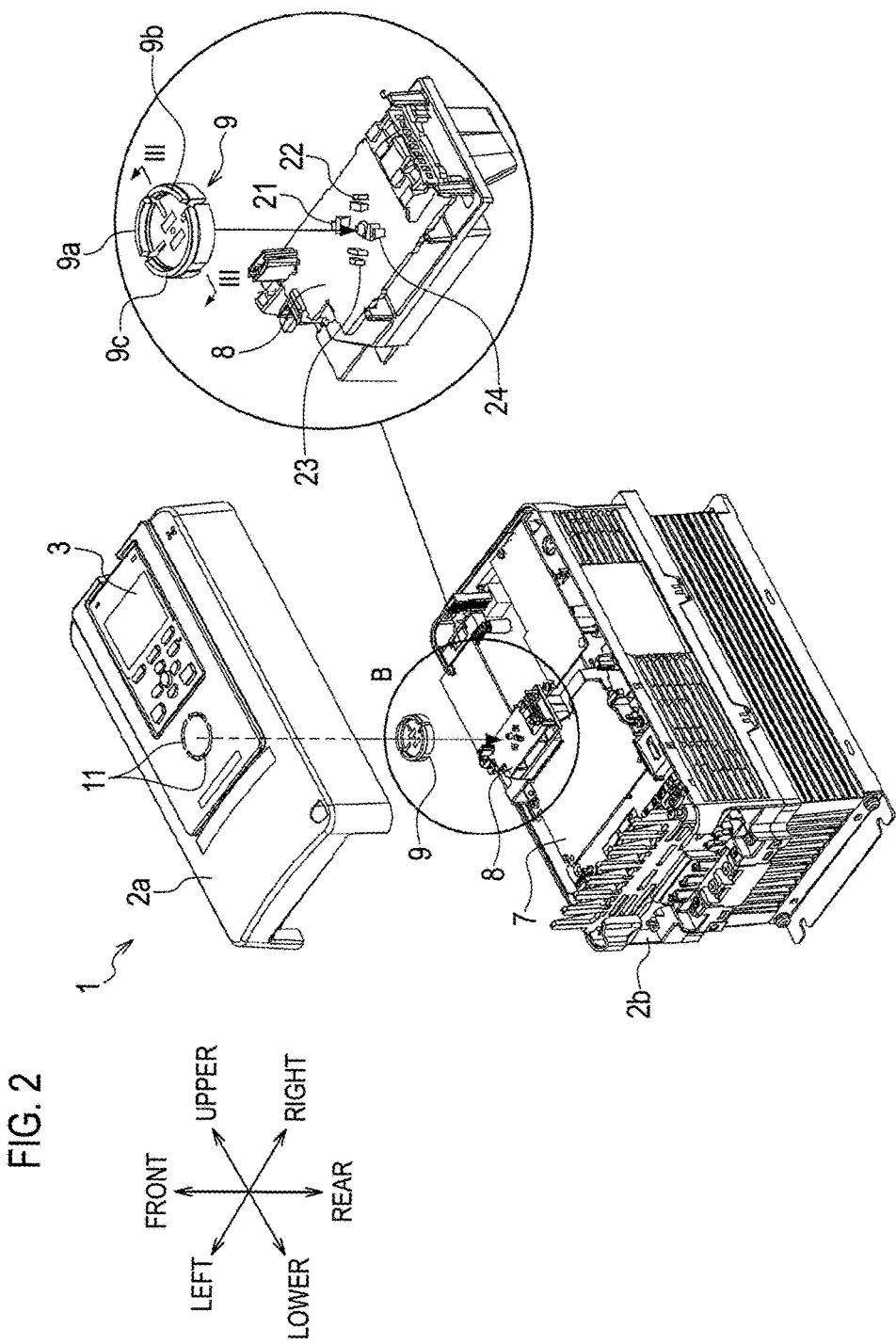
FIG. 2 is an exploded perspective view of the inverter.

FIG. 2 obliquely represents a partial exploded state of the inverter 1. In FIG. 2, the housing 2 of the inverter 1 is detachably divided into a lid portion 2a and a housing main body 2b in a thicknesswise direction (front-rear direction) of the approximately rectangular parallelepiped shape, and houses therein a plurality of control boards 7, an LED substrate 8, and a light-guide body 9. In the inverter 1, a power converting portion (not shown) that feeds drive control power to the motor is mounted on the control boards 7.

In an example shown, in a front-view approximately center of the lid portion 2a, three partially circular-arc shaped fitting holes 11 are provided which have inner peripheral angles of about 90°, about 90°, and about 180°, respectively, and are generally arranged in an approximately annular shape. Further, as shown in an enlarged view of a B portion in the figure where the light-guide body 9 and the LED substrate 8 are included, the light-guide body 9 is made of a material such as translucent resin, and a whole thereof is formed in an approximately cylindrical shape, and at a front face thereof, there are provided three light-projection protrusions 9a, 9b, and 9c each capable of fitting from the rear face side into the three fitting holes 11 of the lid portion 2a. Four LEDs 21, 22, 23, and 24 are placed on the LED substrate 8 with equal intervals in a circumferential direction (see FIG. 4 described later), and in a state where the housing main body 2b, the light-guide body 9, and the lid portion 2a are linked and assembled, each of the LEDs 21, 22, 23, and 24 is housed at an inner circumferential side of the light-guide body 9 (see FIG. 3 described later).

FIG. 3 represents a cross section around the LED indicator 4 as viewed from a cross section taken along an arrow III to III in FIG. 2 in the assembled state described above. In FIG. 3, each of the light-projection protrusions 9a, 9b, and 9c at the front face side of the light-guide body 9 is fitted into each fitting hole 11 of the lid portion 2a, and each distal end thereof is exposed from the lid portion 2a. Further, in an inner circumference at the rear face side of the light-guide body 9, the LEDs 21, 22, 23, and 24 are located, and when each of the LEDs 21, 22, 23, and 24 individually projects light toward an outer circumferential direction, each projection light reflects inside the light-guide body 9 and exits, with irradiation, to outside of the housing 2 from each of the light-projection protrusions 9a, 9b, and 9c. It is noted that each of the LEDs 21, 22, 23, and 24 is controlled to project the light on the basis of a display control signal input via the LED substrate 8 from a control circuit (not shown) mounted on each of the control boards 7. Further, between a light-guide pathway corresponding to each of the light-projection protrusions 9a, 9b, and 9c, an impermeable light-shielding wall 12 is arranged, and as a result, it is possible to suppress the projection light from being leaked and clouded among the light-projection protrusions 9a, 9b, and 9c. A porting including the light-guide body 9, the LED substrate 8 (including the LEDs 21, 22, 23, and 24), and the lid portion 2a therearound described above configures the LED indicator 4, and the LED indicator 4 corresponds to a state display device of industrial machinery set forth in each claim. Further, the control circuit that inputs the display control signal via the LED substrate 8 to each of the LEDs 21, 22, 23, and 24 corresponds to a display controlling portion set forth in each claim.

FIG. 4 represents a front enlarged view obtained when the LED indicator 4 is viewed from the front side in a direction shown by an arrow A in FIG. 1. In an example of the present embodiment, as described above, the three light-projection protrusions 9a, 9b, and 9c of the light-guide body 9 are formed in a partially circular-arc shape with the inner peripheral angles of about 90°, about 90°, and about 180°, respectively, where the two light-projection protrusions 9a and 9b, out of the three, having the inner peripheral angle of about 90° are juxtaposed on right and left sides at an upper side in a semi-annular shape, the one light-projection protrusion 9c having the inner peripheral angle of about 180° is arranged at a lower side, and a whole of these three light-projection protrusions 9a, 9b, and 9c is arranged in an approximately annular shape. In the description that follows, the light-projection protrusion 9a which has the inner peripheral angle of about 90° and which is located at an upper left side is called a RUN displaying portion 31, the light-projection protrusion 9b which has the inner peripheral angle of about 90° and which is located at an upper right side is called an ALARM/ERROR displaying portion 32 (hereinafter, simply referred to as A/E displaying portion 32), and the light-projection protrusion 9c which has the inner peripheral angle of about 180° and which is located at a lower side is called a READY displaying portion 33. Then, the READY displaying portion 33 is projected with light from the two LEDs 23 and 24, out of the four LEDs 21, 22, 23, and 24, the RUN displaying portion 31 is projected with light from the one LED 21, and the A/E displaying portion 32 is projected with light from the one LED 22.

In an example of the present embodiment, the four LEDs 21, 22, 23, and 24 each emit light with the same brightness, and of the four, the two LEDs 23 and 24 corresponding to the READY displaying portion 33 emit light in blue, the one LED 21 corresponding to the RUN displaying portion 31 emits light in green, and the one LED 22 corresponding to the A/E displaying portion 32 emits light in red. It is noted that a combination of the respectively corresponding light-projection protrusions 9a, 9b, and 9c (displaying portions 31, 32, and 33) and the LEDs 21, 22, 23, and 24 corresponds to a displaying portion set forth in each claim and means that displays a state of industrial machinery in a light-emission manner based on the input display control signal. Further, a circuit, a wire and the like which input the display control signal to each of the LEDs 21, 22, 23, and 24 in the LED substrate 8 correspond to an inputting portion set forth in each claim and means that inputs a display control signal corresponding to a state relating to the industrial machinery.

Here, a control state of each portion, in particular, each actuator portion that is a drive portion, in industrial machinery such as a factory automation is changing from time to time, and there is a demand that these control states are desirably checked easily through a visual inspection at a site of work, in addition to a display on a so-called upper-level control device (not shown in particular) that manages a whole of the industrial machinery. For example, an electric motor such as a motor used as an actuator is generally controlled to be driven by drive control power fed from a power conversion device such as the inverter 1 as described above, and thus, the inverter 1 itself is capable of recognizing even the detailed control state that would be otherwise difficult to comprehend simply by checking, through a visual inspection, an operation itself of each actuator portion.

Thus, the operator 3 of the inverter 1 may be provided with a liquid crystal display to allow for a detailed display of the internal control state of the inverter 1; however, in this case, a user him/herself needs to pay attention to the liquid crystal display itself after approaching the inverter 1 of the interest to perform a predetermined operation. However, in many cases, such an inverter 1 is installed at a location apart from a user pathway and in a dark room inside a switchboard or the like, and in such a case, a checking task on the liquid crystal display becomes complicated.

In contrast, the LED indicator 4 provided in the inverter 1 of the present embodiment includes: the LED substrate 8 into which the display control signal according to the state relating to the industrial machinery is input; and a plurality of the LEDs 21, 22, 23, and 24 and the light-guide bodies 9 (light-projection protrusions 9a, 9b, and 9c) that are displayed in a lighting state corresponding to the state of the industrial machinery, on the basis of the display control signal input from the inputting portion. Even when there is no particular operation by the user, and further, even in a dark room, and alternatively, even from a far distance, this enables check of the lighting state of the LED indicator 4 through a visual inspection, and easy and intuitive check of the state of the industrial machinery including the inverter 1. The lighting state of the LED indicator 4 in the present embodiment will be described in detail, below.

A table shown in FIG. 5 represents an example of a corresponding relationship between a lighting state of each of the displaying portions 31, 32, and 33 in the LED indicator 4, and an internal control state of the inverter 1. The lighting states of each of the displaying portions 31, 32, and 33 in the example of the present embodiment include four types of modes, that is, a continuous lighting state, a low-speed flickering state, a high-speed flickering state, and a lights-out state. Here, the continuous lighting state means a state of continuously lighting (emitting light) and the lights-out state means a state of continuously lighting-out (emitting no light). The low-speed flickering state is a state where the lighting state and the lights-out state are intermittently alternated at predetermined time intervals, the high-speed flickering state is a state where the lighting state and the lights-out state are intermittently alternated at time intervals shorter than the low-speed flickering state (so-called flash state).

In FIG. 5, the RUN displaying portion 31 is a displaying portion configured to basically lit corresponding to a state where the inverter 1 is operating normally (rotation drive state of an electric motor). For example, when the inverter 1 feeds a drive control current to the motor in a normal control state, the RUN displaying portion 31 is in the continuous lighting state. Further, when inverter 1 stops the motor from deceleration, or during a drive command input while a speed command=0 is further being input, the RUN displaying portion 31 is in the low-speed flickering state. Further, when the inverter 1 rapidly reduces the speed of the motor due to a sudden stop, or when an interlock is operated to stop the drive, the RUN displaying portion 31 is in the high-speed flickering state. Further, when the inverter 1 does not feed the motor with the drive control power, the lights-out state is in.

The A/E displaying portion 32 is a displaying portion configured to basically lit corresponding to a generation state of an operation abnormality in the inverter 1 (abnormality generation or an abnormality prediction state of an electric motor). For example, when any alarm or error is detected inside the inverter 1, the A/E displaying portion 32 is in the continuous lighting state. Further, in a state equivalent to the alarm generation, or when a so-called oPE signal is detected, or when various types of settings during an automatic tuning are failed or in an error generation state, the A/E displaying portion 32 is in the low-speed flickering state. Further, when an error or an alarm is generated in a so-called STO (SAFE TORQUE OFF) function, the A/E displaying portion 32 is in the high-speed flickering state. Further, when no alarm nor failure is generated in any way and the inverter 1 operates normally, the A/E displaying portion 32 is in the lights-out state.

The READY displaying portion 33 is a displaying portion configured to basically lit corresponding to a state where a condition that a normal operation is possible is satisfied after the inverter 1 is fed with power (drive standby state after the electric motor is turned on). For example, when a state is generally established which is equivalent to a so-called MFMO preparation state such as when the inverter 1 is in a preparation state of a normal drive, when various types of settings are not failed, or when the STO function is released, the READY displaying portion 33 is in the continuous lighting state. Further, when the STO function is activated although in a state where the various types of settings are not failed, the READY displaying portion 33 is in the low-speed flickering state. Further, naturally, when the inverter 1 is in a non-conduction state, when the normal operation is not possible because of a programming mode, when the various types of settings are failed, or when an internal error is generated, the READY displaying portion 33 is in the lights-out state.

Thus, each of the displaying portions 31, 32, and 33 of the LED indicator 4 in the present embodiment is displayed in the lighting state corresponding to the internal control state of the inverter 1. Of these states, in the lighting state of each of the displaying portions 31, 32, and 33, a normal or main state in each of the roles is suggested, and it is also suggested that the faster the flickering, the higher the emergency that requires a certain action.

<Effects of Present Embodiment>

As described above, according to the LED indicator 4 provided in the inverter 1 according to the present embodiment, even when there is no particular operation, and further, even in a dark room, and alternatively, even from a far distance, it is possible for the user to check the lighting state of each of the displaying portions 31, 32, and 33 through a visual inspection, and it is possible to easily and intuitively check the control state of the industrial machinery including the inverter 1. Further, although not particularly shown, when the inverters 1 are arranged to be juxtaposed in a plural number, for example, the user comprehends the respective functions and roles, and at the same time, the lighting states of each of the displaying portions 31, 32, and 33 are collectively displayed in a list format, whereby it is also possible to intuitively check a cooperative control state of each actuator in a whole of the industrial machinery. As a result, it is possible to easily check the control state of industrial machinery.

Further, in particular, in the present embodiment, each of the displaying portions 31, 32, and 33 has an LED as a light source. This provides an advantage that the display in the LED indicator 4 consumes less power as compared to a liquid crystal panel, and thus, a longer lighting operation is possible without a need of switching to a sleep mode.

Further, in particular, in the present embodiment, the LED indicator 4 has a plurality of displaying portions 31, 32, and 33. This allows the LED indicator 4 to simultaneously display a plurality of internal control states for the inverter 1 or combine the lighting states of each of the plurality of displaying portions 31, 32, and 33, whereby it is possible to ensure that the display manners have variations.

Further, in particular, in the present embodiment, the plurality of displaying portions 31, 32, and 33 are arranged, as a whole, in an approximately annular shape. For example, when the plurality of displaying portions 31, 32, and 33 are simply arranged to be juxtaposed in a linear manner (not shown), even when these portions are collectively observed through a visual inspection, it is difficult to distinguish the respective lighting states. In contrast, in the present embodiment, the positioning of each of the displaying portions 31, 32, and 33 in a circumferential direction in the approximately annular arrangement facilitates the visual inspection while distinguishing the respective lighting states.

Further, in particular, in the present embodiment, the plurality of displaying portions 31, 32, and 33 each have a partially circular-arc shape. As a result, when the plurality of displaying portions 31, 32, and 33 are arranged in an approximately annular shape, a whole of an outer appearance itself is shaped to be almost annular, whereby it is possible to improve the beauty of the appearance.

Further, in particular, in the present embodiment, the plurality of displaying portions 31, 32, and 33 include the two displaying portions 32, 32 that generally configure a half ring at one side of the approximately annular shape, and the one displaying portion 33 that generally configures a half ring at the other side of the approximately annular shape. As a result, in a case where the three displaying portions 31, 32, and 33 are arranged in an approximately annular shape, when the one READY displaying portion 33 that generally configures the half ring is compared with each of the other two RUN displaying portion 31 and A/E displaying portion 32, a circumferential length is differed, whereby the outer appearance is obviously differed. That is, it is possible to differentiate a visibility among the plurality of displaying portions 31, 32, and 33. In particular, as shown in an example of the present embodiment, when the circumferential length of the READY displaying portion 33 is made longest to be noticeable, it is possible to focus on the most basic state, that is, a power-on state of the inverter 1.

Further, in particular, in the present embodiment, the light-shielding wall 12 is arranged between the adjacent displaying portions, out of the plurality of displaying portions 31, 32, and 33. As a result, it is possible to prevent the light from being leaked between the adjacent displaying portions 31, 32, and 33, and it is possible to prevent the respective lit light from being clouded in color and to clarify the lighting state in a unit of each of the displaying portions 31, 32, and 33.

Further, in particular, in the present embodiment, the lighting state of the plurality of displaying portions 31, 32, and 33 is displayed in a mode corresponding to at least one of: continuous lighting, intermittent flickering at predetermined time intervals (low-speed flickering), and intermittent flickering at an interval shorter than the predetermined time interval. This allows the lighting state in a unit of the displaying portions 31, 32, and 33 to have variations. In particular, by a difference in time intervals of the intermittent flickering, it is possible to intuitively express a difference in emergency and the like.

Further, in the present embodiment, in particular, the lighting states of the plurality of displaying portions 31, 32, and 33 are displayed in a light-emission color corresponding to a state of the industrial machinery. This facilitates a visual discrimination in a unit of each of the displaying portions 31, 32, and 33. In particular, a difference in light-emission color makes it possible to intuitively express a basic display content, a difference in emergency, or the like of the displaying portions 31, 32, and 33.

It is noted that in addition to the difference in lighting state by the above-described distinguishment, a difference in lighting state by the brightness (quantity of light) in each of the displaying portions 31, 32, and 33 may be provided. In this case, it is possible to provide a quantitative expression by changing the brightness continuously or stepwise. This allows the lighting state in a unit of the displaying portions 31, 32, and 33 to have variations. In particular, by a difference in brightness, it is possible to intuitively express a difference in emergency and the like. Further, while it is possible to ensure the visibility by increasing a display brightness in a case where the surrounding is bright, it is also possible to reduce the power consumption by decreasing the display brightness in a case where the surrounding is dark.

Further, in particular, in the present embodiment, when the LED indicator 4 is applied to the inverter 1, the plurality of displaying portions 31, 32, and 33 are displayed in a manner corresponding to at least one of: a rotation drive state of a motor (RUN); a drive standby state after the motor is turned on (READY); and an abnormality generation or an abnormal prediction state of a motor (ALARM/ERROR). This enables a suitable application to the inverter 1 that requires a clear distinguishment in a control state. In particular, it becomes possible to clearly and visually distinguish among the rotation drive state of a motor (RUN), the drive standby state after a motor is turned on (READY), and the abnormality generation or the abnormal prediction state of a motor (ALARM/ERROR).

<Modification>

It is noted that the disclosed embodiment is not limited to the above content, and it is possible to modify variously as long as it does not depart from its effect and the technical idea. Such a modification will be described, below.

(1) Case where Rotation Direction, Rotation Speed and the Like of Motor are Visually Displayed A corresponding relationship between the lighting state of each of the displaying portions 31, 32, and 33 in the LED indicator 4 and its display content is not limited to the example shown in the foregoing FIG. 5; and may be arbitrarily (programmably) set by the user. For example, when the LED indicator 4 arranged in an annular shape described above is applied to the inverter 1 that drives and controls the motor, as in the present embodiment, the rotation control state of a motor may be visually (intuitively) displayed with taking advantage of a characteristic of an outer appearance provided in the annular shape.

For example, as shown in FIG. 6, when the motor is driven forwardly, the three displaying portions 31, 32, and 33 are altered to be lit sequentially in a clockwise direction, and when the motor is driven reversely, the three displaying portions 31, 32, and 33 are altered to be lit sequentially in a counterclockwise direction, whereby the three displaying portions may be displayed so that it is possible to intuitively comprehend the rotation direction of the motor. Thus, when the plurality of displaying portions 31, 32, and 33 display, as a rotation drive state of the motor, the rotation drive state in a forward direction and the rotation drive state in a reverse direction in a manner capable of distinguishing the one state from the other, it becomes possible to easily check the rotation direction through a visual inspection out of the rotation drive states of the motor. In particular, in an application where the frequency to alter the rotation direction is low, it is clearly and easily check visually the generation of abnormality from the display manner in which the forward rotation and the reverse rotation are frequently altered.

Further, in the rotation display, the plurality of displaying portions 31, 32, and 33 may change a display alternating speed in accordance with the rotation speed of the motor. That is, when each of the displaying portions 31, 32, and 33 in a lighting state is displayed in a manner to continuously move at a speed corresponding to the rotation speed of the motor, it is possible to intuitively check, through a visual inspection, a mechanical operation state of the motor including the rotation speed and the rotation direction.

It is noted that although not particularly shown, the plurality of displaying portions 31, 32, and 33 may be displayed in a manner to correspond to at least one of the magnitude of the drive torque of the motor and the magnitude of a supply current value. In this case, the displaying portions 31, 32, and 33 may display quantitatively the same according to difference in a lighting location, the number of lighting, a lighting brightness, the rotation speed, or the like of the displaying portions 31, 32, and 33. This enables intuitive check, through a visual inspection, of an electric control state of the motor such as the magnitude of the drive torque or the magnitude of the supply current value.

(2) Case where Various Types of States in Radio Communication are Displayed

The display of each of the displaying portions 31, 32, and 33 of the LED indicator 4 may display not only the internal control state of the applied industrial machinery (inverter 1) but also a communication state with outside, in particular, a communication state via radio communication such as Wi-Fi (registered trademark), Bluetooth (registered trademark) or the like. For example, as shown in FIG. 7, in an environment where a large number of inverters 1 are juxtaposed, when the user transmits a command to a specific inverter 1 via a radio communication from a mobile terminal 41 (operation terminal) such as a smartphone and a tablet, there is a case where it is desired to check through a visual inspection which inverter 1 actually receives the command. At this time, when the inverter 1 that actually receives the command displays the reception state with the LED indicator 4, it is possible for the user to clearly and visually check the inverter 1.

Further, in addition to the display of such an actual command exchange state, a good or bad state of an information exchange via a radio communication, a state of during an information exchange, a state of a completion of the information exchange, or the like may be displayed. In particular, when a so-called adhoc network (mutual recognition radio communication) such as Bluetooth (registered trademark) is constructed, it is useful that the inverter 1 that successfully establishes pairing (completes mutual recognition) with the mobile terminal 41 held by the user displays a pairing state with the display of the LED indicator 4.

Further, the adaptability to the inverter 1 of information such as data transmitted from the mobile terminal 41 to the inverter 1 (whether a data format or a content is adaptive or inadaptive) may also be displayed by the LED indicator 4 in a predetermined manner. This enables clear and visual check whether the data transmitted from the mobile terminal 41 to the inverter 1 is adaptive to the inverter 1.

(3) Case where LED Indicator is Configured to be Detachable from Inverter

Figure 8:
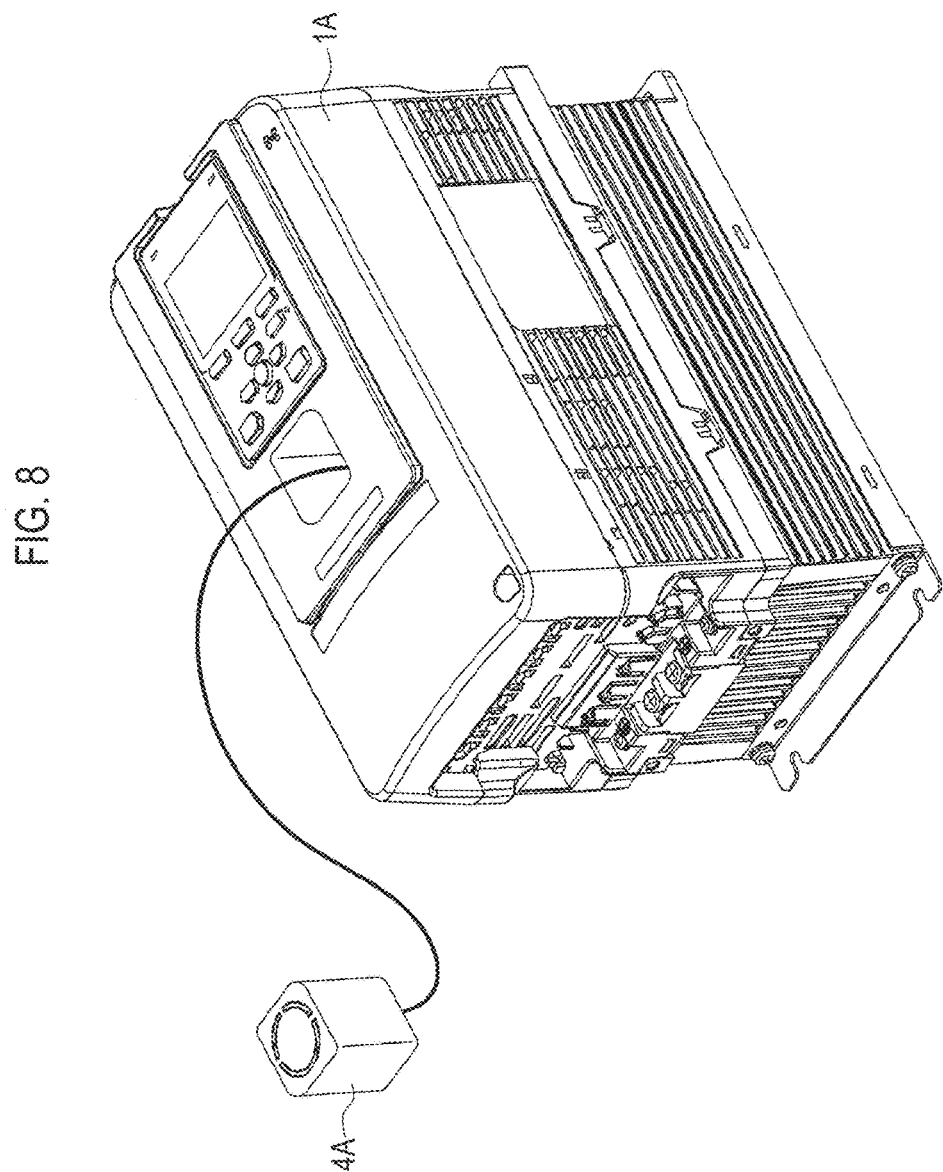
FIG. 8 is an external view obtained when the LED indicator is configured to be detachable from the inverter.

In the above-described embodiment, the LED indicator 4 and the inverter 1 are formed integrally; however, this is not limiting. For example, as shown in FIG. 8, the LED indicator 4A itself may be configured to be detachable so as to be independently separated from the main body of the inverter 1A. It is noted that in an example shown, the inverter 1A and the LED indicator 4A are connected wirelessly to exchange a display control signal; however, otherwise a display control signal may also be exchanged via radio communication. As a result, while the arrangement of each component such as the inverter 1A in the industrial machinery, for example, may remain unchanged, it is possible to arrange only the LED indicator 4A near a user pathway to be easily viewed, for example, whereby the degree of freedom in layout may be improved.

(4) Others

In addition to the above-described embodiment and modification, various alternatives may be possible. For example, an internal state about a maintenance inspection other than a normal operation may be displayed in a predetermined lighting state in the LED indicator 4. As an example, although particularly not shown, so that a telephone response is easily performed with a service center during a maintenance inspection of an inverter, the internal state of the inverter may be easily displayed on the LED indicator 4.

It is noted that in the above-described embodiment, the LED indicator 4 is configured by the three displaying portions 31, 32, and 33; however, displaying portions configured by other numbers may be arranged in a predetermined arrangement. The light-emission color of each of the displaying portions 31, 32, and 33 may be light-emission color in other than blue, red, and green, the arrangement or a combination may be changed, or the same color may be chosen for all the displaying portions 31, 32, and 33. Alternatively, a plurality of light-emission colors may be switched to be lit in each of the respective displaying portions 31, 32, and 33.

Further, other than the rotation display shown in the foregoing FIG. 6, the plurality of displaying portions 31, 32, and 33 are coordinated and lit in a predetermined linking manner. For example, although not particularly shown, all the displaying portions 31, 32, and 33 may be synchronized and flickered, synchronized and flickered in a specific combination, or randomly flickered.

Further, a liquid crystal panel arranged on the operator 3 may be displayed in a display manner equivalent to the lighting state of the LED indicator 4. In this case, the liquid crystal panel corresponds to a state display device of industrial machinery set forth in each claim.

It is noted that "approximately" in the discussion above has a meaning with a margin by excluding a strict interpretation about a subsequent description. For example, "approximately annular shape" includes a distortion such as a partial missing/cut and an ellipse, permits a tolerance and an error in design and manufacture, and means "substantially annular shape".

Further, other than the above-described discussion, a technique by the above embodiment or modification may be appropriately combined and used.

In addition, although not particularly provided as an example, the above-described embodiment or each modification may be embodied with various types of changes without departing from the scope thereof.

REFERENCE SIGNS LIST

1, 1A inverter (industrial machinery, power conversion device)
2 housing
2a lid portion
2b housing main body 3 operator
4, 4A LED indicator (state display device of industrial machinery)
7 control board
8 LED substrate (inputting portion)
9 light-guide body
9a, 9b, 9c light-projection protrusion (displaying portion)
11 fitting hole
12 light-shielding wall
21, 22, 23, 24 LED (display)
31 RUN displaying portion (display)
32 ALARM/ERROR displaying portion (display)
33 READY displaying portion (display)
41 mobile terminal (operation terminal)

The invention claimed is:

1. A state display device of industrial machinery, comprising:
an inputter configured to input a display control signal according to a state relating to the industrial machinery; and
a plurality of displays configured to display in a lighting state corresponding to a state of the industrial machinery, on the basis of the display control signal input by the inputter,
wherein the plurality of displays is positioned in an approximately annular shape, the plurality of displays comprises two displays forming a half ring at one side of the approximately annular shape and one display forming a half ring at the other side of the approximately annular shape, the industrial machinery is a power conversion device that converts an external supply power into a drive control power to an electric motor, and the plurality of displays is configured to display in a lighting state corresponding to at least one of a rotation drive state of the electric motor, a drive standby state after the electric motor is turned on, and an abnormality generation or an abnormality prediction state of the electric motor.

2. The state display device of industrial machinery according to claim 1, wherein
the plurality of displays includes an LED as a light source.

3. The state display device of industrial machinery according to claim 2, wherein each of the displays has a partial circular-arc shape.

4. The state display device of industrial machinery according to claim 1, wherein each of the displays has a partial circular-arc shape.

5. The state display device of industrial machinery according to claim 1, further comprising:
a light-shielding wall positioned between adjacent displays in the plurality of displays.

6. The state display device of industrial machinery according to claim 1, wherein
the plurality of displays is configured to display in the lighting state corresponding to at least one of continuous lighting, intermittent flickering at predetermined intervals, and intermittent flickering at an interval shorter than the predetermined intervals.

7. The state display device of industrial machinery according to claim 1, wherein the plurality of displays is configured to display, as the lighting state, in a light-emission color corresponding to a state of the industrial machinery.

8. The state display device of industrial machinery according to claim 1, wherein the plurality of displays is configured to display, as the lighting state, in a brightness corresponding to a state of the industrial machinery.

9. The state display device of industrial machinery according to claim 1, wherein
the plurality of displays is configured to display, as the rotation drive state of the electric motor, in a lighting state in a manner to mutually distinguish between the rotation drive state in a forward direction and the rotation drive state in a reverse direction.

10. The state display device of industrial machinery according to claim 1, wherein
each of the displays in a lighting state is configured to display in a lighting state in a manner to continuously move at a speed corresponding to a rotation speed of the electric motor.

11. The state display device of industrial machinery according to claim 1, wherein
the plurality of displays is configured to display in a lighting state corresponding to at least one of a magnitude of a drive torque of the electric motor or a magnitude of a supply current value.

12. The state display device of industrial machinery according to claim 1, wherein
the power conversion device is configured to exchange information, through mutual recognition radio communication, with respect to an operation terminal, and
the plurality of displays is further configured to display in a lighting state corresponding to at least one of a good or bad state of the information exchange, a complete state of the mutual recognition, a state of during the information exchange, and a state of a completion of the information exchange, via the mutual recognition radio communication.

13. The state display device of industrial machinery according to claim 11, wherein
the plurality of displays is configured to display in a lighting state according to adaptability of data to the power conversion device, where the data is transmitted from the operation terminal to the power conversion device.

14. The state display device of industrial machinery according to claim 1, wherein
the state display device of the industrial machinery is detachable from the industrial machinery.

15. A power conversion device, comprising:
a power convertor configured to convert an external supply power into a drive control power to an electric motor;
a display controller configured to output a display control signal according to a state relating to the power converter; and
a plurality of displays configured to display in a lighting state corresponding to a state of the power convertor, on the basis of the display control signal, wherein
the plurality of displays is positioned in an approximately annular shape,
the plurality of displays comprises
two displays forming a half ring at one side of the approximately annular shape and
one display forming a half ring at the other side of the approximately annular shape.

16. The power conversion device according to claim 15, wherein
the plurality of displays is configured to display in a lighting state corresponding to at least one of a rotation drive state of the electric motor, a drive standby state after the electric motor is turned on, and an abnormality generation or an abnormality prediction state of the electric motor.

17. The power conversion device according to claim 16, wherein
  the plurality of displays is configured to display, as the rotation drive state of the electric motor, in a lighting state in a manner to mutually distinguish between the rotation drive state in a forward direction, and the rotation drive state in a reverse direction.

18. The power conversion device according to claim 16, wherein
  each of the displays in a lighting state is configured to display in a lighting state in a manner to continuously move at a speed corresponding to a rotation speed of the electric motor.

19. The power conversion device according to claim 16, wherein
  the plurality of displays is configured to display in a lighting state corresponding to at least one of a magnitude of a drive torque of the electric motor or a magnitude of a supply current value.

* * * * *